Oct. 23, 1923. 1,471,838
A. L. DUNCAN
APPARATUS FOR PREPARING FRUIT FOR CANNING
Filed May 16, 1923   2 Sheets-Sheet 1
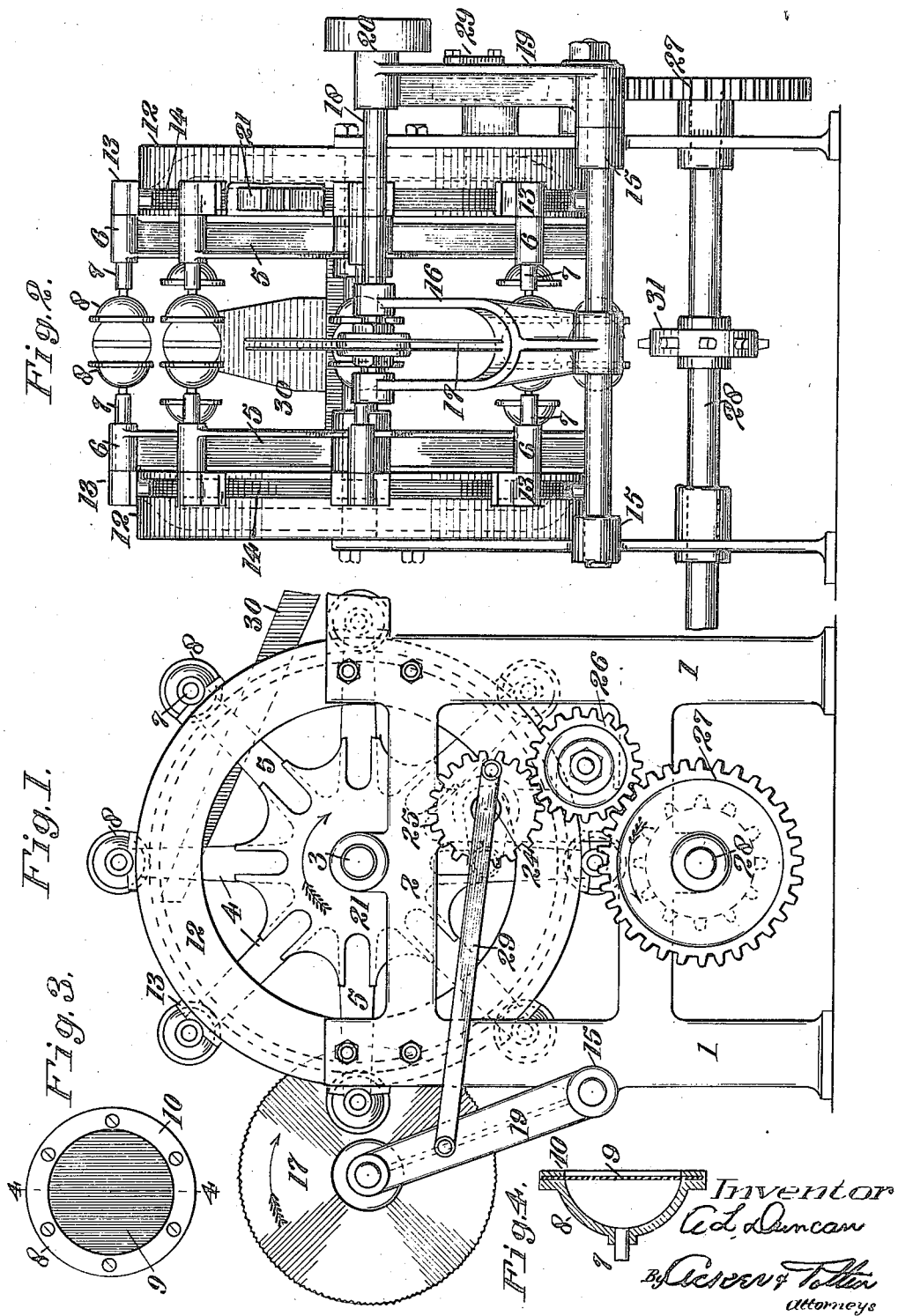

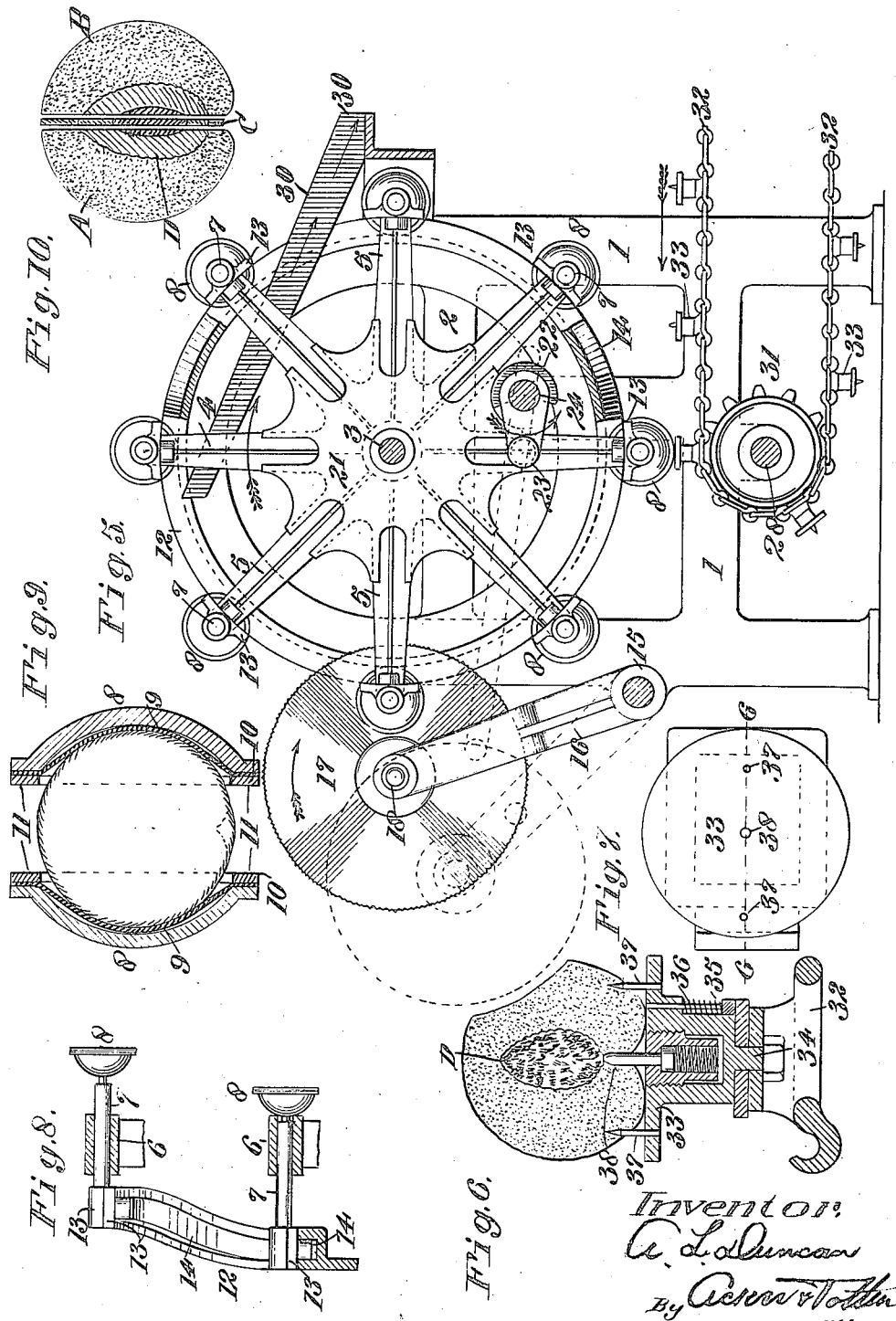

Patented Oct. 23, 1923.

1,471,838

UNITED STATES PATENT OFFICE.

ARTHUR L. DUNCAN, OF OAKLAND, CALIFORNIA, ASSIGNOR OF ONE-THIRD TO E. H. DUNCAN AND ONE-THIRD TO CHARLES E. FORRY, BOTH OF OAKLAND, CALIFORNIA.

APPARATUS FOR PREPARING FRUIT FOR CANNING.

Application filed May 16, 1923. Serial No. 639,348.

*To all whom it may concern:*

Be it known that I, ARTHUR L. DUNCAN, a citizen of the United States, residing at Oakland, in the county of Alameda and State of California, have invented certain new and useful Improvements in Apparatus for Preparing Fruit for Canning, of which the following is a specification.

The present invention relates to the improving of the appearance of canned fruits, particularly peaches, and at the same time to facilitate the removal of the pit from the fruit during its halving, thus materially reducing the cost of cutting and processing, dispensing with women operators, and at the same time utilizing all of the meat of the fruit.

In carrying out the invention, I have discovered that by cutting entirely through the fruit and pit at spaced points on either side of the largest circumference of the pit, dividing the fruit into halves, each retaining but a small portion of the pit, and cutting a slice from the center of the fruit which contains the remainder of the pit, that relatively small portions of the pit remaining in the halves can be easily removed and that but a relatively shallow pit depression remains in the respective halves, rendering the same easily cleaned during the processing of the fruit, provides fruit halves that are attractive in appearance, due to the absence of the deep pit recess, and to which halves the eye of the purchasing consumer is drawn.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

In carrying out the invention I prefer to employ an organized apparatus containing elements operated in co-operating timed relation and adapted for engaging the fruit supplied by a feeding means and presenting the same to a cutting mechanism for severing a slice centrally therefrom, and after the fruit is thus halved by the formation of the slice, discharging the same from the apparatus for further treatment, the apparatus also including particular refinement and an arrangement of parts to facilitate its rapid, cheap, economic operation, and the preferred embodiment of the apparatus is illustrated in the accompanying drawings, wherein—

Fig. 1 is a view in side elevation.

Fig. 2 is a view in front elevation, illustrating the relation of the saws and fruit from which a slice has been cut thereby.

Fig. 3 is a view in end elevation of one of the engaging cups, particularly illustrating the elastic member over the mouth thereof.

Fig. 4 is a vertical sectional view taken on line 4—4 of Fig. 3.

Fig. 5 is a view similar to Fig. 1 with one of the side members of the main plane removed, illustrating particularly the interlocking Geneva movement for driving the rotating cup carrying frame, one of the cam tracks, and the fruit feeding conveyor, also in dotted lines the stroke of the cutting saws.

Fig. 6 is a vertical sectional view of one of the peach conveying units.

Fig. 7 is a top plan view of the unit illustrated in Fig. 6.

Fig. 8 is a broken sectional view illustrating two of the engaging cups of different pairs of cups carried by the rotating frame and their association with one of the cam tracks.

Fig. 9 is a sectional view of the fruit engaging cups forming a pair, illustrating the fruit engaged thereby, and particularly disclosing the elastic members carried thereby in expanded position.

Fig. 10 is a vertical sectional view of a peach, illustrating the manner in which the same is cut through the meat and stone to sever a slice from the center thereof.

In the drawings, 1 indicates a main frame of any suitable construction and to the top of any which are journaled the opposite bars 2 of an axle 3 illustrated as being horizontally disposed. The axle mounts a rotating frame comprising the spaced side frame forming members 4 from the hub of which radiate the respective arms 5, forming a conventional spider construction when viewed in elevation. The members 5 are disposed in spaced vertical planes and horizontally in the ends of each arm is mounted to reciprocate in a guide recess 6 a spindle 7, each carrying on its inner end a cupped fruit engaging member 8. The members 8 carried by the arms 5 of opposing members 4 are disposed in opposing relation, forming pairs of fruit engaging cups, as illustrated in Figs. 2 and 9 of the drawings. Over the cupped face of each cup 8 is stretched an elastic member 9 retained in position by a face plate retaining ring 10 secured to the periphery of the mouths of the respective cups as at 11.

Positioned one on each outer side of the members 4 and carried by the main frame 1 are the circular cam tracks 12 disposed in vertical planes, and each member 7 is provided on its outer end with a shoe 13 operating in the track lying adjacent the respective members 4. The grooves 14 of the cam tracks 12 are so formed as to cause a separation of the cups of the respective pairs during a portion of the revolution of the rotating frame to move the same together during any portion of travel of the frame and to again separate them during the remaining portion of travel of the frame, thus completing the circle of their operation during the complete revolution of the rotating frame.

Pivotally mounted on a horizontal axis at its lower end as at 15 is a saw frame 16 the upper bifurcated free end of which is adapted for arcuate swinging movement to and from the peripheral edge of the members 4 of the rotating frame. In said bifurcated end the frame 16 mounts the cutting saws 17 disposed in slight spaced relation and carried on a shaft 18 the end of which is supported by a bracket 19, the shaft carrying the power wheel 20.

The saws 17 are positioned so that the same on the inward swinging movement of the frame 16 will intersect the path of movement of the cups 8 of the respective pairs, as illustrated in Fig. 2.

To impart intermittent rotation to the rotary frame I associate with one member 4 thereof the interlocking radially slotted plate 21 forming one member of the conventional Geneva gear and with said plate cooperates the conventional locking cam 22 and operating pin 23 forming the other element of the well known type of Geneva gear. The members 22 and 23 are carried by a rotating shaft 24. The shaft 24 carries a gear 25 which is driven through an intermittent gear 26 operated from the gear 27 associated with the power shaft 28 carried by the frame 1. The saw frame 16 is connected through a link 29 with the gear 25 so that on each successive operation of the gear 25 it imparts a step rotation to the rotating frame to present a successive pair of cup members 8 within the operating sphere of the saws to impart a swinging movement to the saw frame and cause the saws to cut through the fruit and its pit, severing the fruit into halves A and B and cutting from the center thereof a slice C. This cutting operation severs a slice from the center of the fruit on the line of the largest diameter of the stone, and which slice is not wasted but is utiltized in the making of pie fruit. The portions of the stone D remaining in the halves A and B are relatively small and are easily removed by the use of pitting devices, leaving but a relatively slight depression in the cut faces of the fruit, and which depressions are easily cleaned in the subsequent treatment of the fruit for canning.

A downwardly inclined runway 30 is adapted to receive the cut halves and slices of the fruit on the respective pairs of cups arriving at their uppermost position after the fruit has been acted on by the saws, as at this time the cups are separated, due to the curvature of the groove 14.

Any suitable mechanism may be employed for feeding the fruit to be cut to be engaged by the respective cups, and the present feeding mechanism is constructed as follows:— About a sprocket 31 on the shaft 28 operates a chain 32, certain spaced links of which carry disks 33 disposed in a horizontal plane and provided on their base with a stud 34 passing through the respective links, the studs affording a means for axially rotating the disks 33 relatively to their respective links. A spring 35 guided by a member 36 frictionally retains the respective members 33 in their adjusted position. From the face of the members 33 project the fruit retaining pins 37 and the spring pressed pin 38 for receiving in the stem formed depression in the fruit.

The operator manualy positions the peach to be cut, stem side downward, on the successive members 33, with the members 37 impaling the fruit and the member 38 received in the stem forming depression. By the operator's eye the member 33 is axially rotated to present the largest diameter of the fruit pit D in parallel alignment with the saws 17 so that when the cupped members 8 are operated in timed relation with the movement of the members 33 to remove the fruit from one of the members 33, it will be presented in the proper manner to the saw 17 so that the same will cut one on either side of the largest circumference of the stone.

Having thus described my invention, what I claim and desire to protect by Letters Patent of the United States is:—

1. An apparatus for halving a pit containing fruit particularly a peach, including a pair of opposing fruit engaging members movable in a closed path, and a pair of spaced rotary cutters also movable in a closed path to intersect the path of movement of the fruit engaging members and to pass between the same to cut a section from the fruit carried between said members.

2. An apparatus for halving a pit containing fruit particularly a peach, including a pair of opposing cupped fruit engaging members movable to and from each other into fruit engaging and releasing position, a pair of spaced cutting members mounted on a common rotating axis, means for moving the cutters and cupped engaging members into relative intersecting relation whereby a section is severed from the fruit carried between said members.

3. An apparatus for halving a pit containing fruit particularly a peach, including a plurality of pairs of opposing fruit engaging members movable to and from each other and about a fixed axis and into fruit engaging and releasing position, a pair of spaced cutting members mounted on a common rotating axis, means for moving said cutters and fruit engaging members into relative co-operating relation whereby the cutting members pass between successive pairs of fruit engaging members for cutting through the fruit and severing a section from the fruit carried between said members.

4. An apparatus for halving a pit containing fruit particularly a peach, including a cutting element, a pair of opposing cupped fruit engaging members movable to and from each other into fruit engaging and releasing position, said cutting element and fruit engaging members movable into relative cooperation one intersecting the path of the other, and an elastic member stretched over the mouth of each cupped member.

5. An apparatus for halving a pit containing fruit particularly a peach, including a cutting element, a pair of opposing cupped fruit engaging members for presenting the fruit to the cutting element and movable to and from each other into fruit engaging and releasing position and an elastic member positioned over the mouth of each cupped member.

6. An apparatus for halving a pit containing fruit particularly a peach, including means for holding a fruit, and means adapted to pass therebetween and through the fruit held thereby and the fruit pit, to sever a slice from the fruit, the severed slice and the remaining portions of the fruit from which the slice is cut each retaining a portion of the pit.

7. An apparatus for halving a pit containing fruit particularly a peach, including a pair of opposing relatively separable cupped members each provided with yielding surfaces for holding a fruit therebetween, and means adapted to pass between said cupped members and through the fruit held thereby and the fruit pit to sever the fruit into sections, each retaining a portion of the pit, said yielding surface adapted for expelling the fruit from the respective cupped members on their relative separation.

8. An apparatus for halving a pit containing fruit particularly a peach, including a rotatable frame mounted on a fixed axis, a plurality of pairs of opposing fruit engaging members carried in spaced relation peripherally of the frame and said members of each pair being movable to and from each other into fruit engaging and releasing position, a pivoted saw frame, a pair of parallel spaced saws carried by said frame and rotatably mounted on a common axis, means for operating said rotatable saw frame in timed relation to cause said saws to pass through the fruit and its contained pit carried between engaging means of successive pairs of members and to cut a slice therefrom containing a portion of the pit, means for presenting fruit to said engaging members, means for operating said engaging members to engage the presented fruit and to move it to be acted on by the saws, means for separating the engaging members to release the cut fruit therefrom, and means for receiving the slice and remaining sections of the fruit on the separation of said engaging members.

9. An apparatus for halving a pit containing fruit particularly a peach, including a rotatable frame comprising corresponding side plates, a plurality of fruit engaging members carried by the respective side plates of said frame and disposed in opposing spaced relation to each other forming pairs, a pair of cam tracks disposed one adjacent to each face plate, means associated with said fruit engaging members and cooperating with said cam tracks for causing the relative movement of the fruit engaging members of the respective pairs into fruit engaging and releasing position, means associated in timed relation with the rotation of the frame for positioning successive fruits for engagement by the pairs of members, a pair of rotatable saws movable in timed relation between the frame plate as successive pairs of fruit engaging members are presented thereto to cut the fruit carried thereby into a plurality of sections each retaining a portion of the pit, and means for receiving the cut fruit from the respective holding members on their movement to releasing position.

In testimony whereof I have signed my name to this specification.

ARTHUR L. DUNCAN.